US012614851B2

(12) United States Patent
Li

(10) Patent No.: US 12,614,851 B2
(45) Date of Patent: Apr. 28, 2026

(54) DISPLAY MODULE AND ELECTRONIC DEVICE

(71) Applicant: Yungu (Gu'an) Technology Co., Ltd., Langfang (CN)

(72) Inventor: Weiguo Li, Langfang (CN)

(73) Assignee: Yungu (Gu'an) Technology Co., Ltd., Langfang (CN)

( * ) Notice: Subject to any disclaimer, the term of this patent is extended or adjusted under 35 U.S.C. 154(b) by 343 days.

(21) Appl. No.: 18/475,533

(22) Filed: Sep. 27, 2023

(65) Prior Publication Data

US 2024/0021994 A1 Jan. 18, 2024

Related U.S. Application Data

(63) Continuation of application No. PCT/CN2022/114417, filed on Aug. 24, 2022.

(30) Foreign Application Priority Data

Dec. 31, 2021 (CN) ......................... 202111678344.4

(51) Int. Cl.
*H01Q 9/04* (2006.01)
*H01Q 1/22* (2006.01)
*H01Q 1/38* (2006.01)

(52) U.S. Cl.
CPC ......... *H01Q 9/0407* (2013.01); *H01Q 1/2291* (2013.01); *H01Q 1/38* (2013.01)

(58) Field of Classification Search
CPC ...... H01Q 1/22; H01Q 9/0407; H01Q 1/2291; H01Q 1/38; H01Q 21/28; G06F 3/041
See application file for complete search history.

(56) References Cited

U.S. PATENT DOCUMENTS 10,826,162 B1 11/2020 Jeon et al.
12,266,641 B2 * 4/2025 Pfeuffer .............. H01L 25/0753
2014/0328084 A1 11/2014 Chuang et al.
(Continued)

FOREIGN PATENT DOCUMENTS

CN 201233951 Y 5/2009
CN 102467169 A 5/2012
(Continued)

OTHER PUBLICATIONS

International Search Report issued on Sep. 22, 2022, in corresponding International Application No. PCT/CN2022/114417; 4 pages.
(Continued)

*Primary Examiner* — Wilson Lee
(74) *Attorney, Agent, or Firm* — Maier & Maier, PLLC

(57) ABSTRACT

A display module and an electronic device. The display module includes a display area and a non-display area arranged around at least a part of the display area. The display module includes: a carrier including a first surface and a second surface arranged oppositely and a side surface located between the first surface and the second surface and in the non-display area; and a first antenna including a first body and at least one connecting point connected with the first body, in which the first body is arranged in the carrier, and the connecting point is exposed on the side surface for being electrically connecting with a second antenna located outside the carrier.

20 Claims, 6 Drawing Sheets

(56) References Cited

U.S. PATENT DOCUMENTS

| | | | | |
|---|---|---|---|---|
| 2021/0273029 | A1 | 9/2021 | Bang et al. | |
| 2021/0328339 | A1 | 10/2021 | Tsai et al. | |
| 2021/0333842 | A1* | 10/2021 | Fabrega Sanchez | G06F 1/1626 |
| 2022/0052387 | A1* | 2/2022 | Takahashi | H02J 7/005 |
| 2022/0094047 | A1* | 3/2022 | Kogure | H01Q 1/2283 |
| 2022/0320233 | A1* | 10/2022 | Wang | H04M 1/0266 |
| 2024/0065035 | A1* | 2/2024 | Yamazaki | H10K 71/60 |
| 2025/0139397 | A1* | 5/2025 | Finn | G06K 19/02 |

FOREIGN PATENT DOCUMENTS

| | | | |
|---|---|---|---|
| CN | 103593082 | B | 5/2016 |
| CN | 109167154 | A | 1/2019 |
| CN | 105824460 | B | 4/2019 |
| CN | 111725611 | A | 9/2020 |
| CN | 211980876 | U | 11/2020 |
| CN | 106571538 | B | 1/2021 |
| CN | 112216958 | A | 1/2021 |
| CN | 112352414 | A | 2/2021 |
| CN | 112732112 | A | 4/2021 |
| CN | 112864582 | A | 5/2021 |
| CN | 112882271 | A | 6/2021 |
| CN | 113066391 | A | 7/2021 |
| CN | 113067141 | A | 7/2021 |
| CN | 113067917 | A | 7/2021 |
| CN | 113196567 | A | 7/2021 |
| CN | 114336012 | A | 4/2022 |
| EP | 2600362 | A2 | 6/2013 |
| JP | 2000357914 | A | 12/2000 |
| TW | M581773 | U | 8/2019 |

OTHER PUBLICATIONS

Office Action issued on Jan. 30, 2023, in corresponding Chinese Application No. 202111678344.4; 9 pages.

Office Action issued on Apr. 13, 2023, in corresponding Chinese Application No. 202111678344.4; 9 pages.

Office Action issued on Jun. 30, 2023, in corresponding Chinese Application No. 202111678344.4; 7 pages.

Yuan et al., "Fabrication of stretchable circuit with high resolution linewidth and complex pattern via printing method on silicone substrate", Science and Technology Herald, Issue 17; Sep. 13, 2017; 7 pages; English Abstract provided.

Mousa et al., "Fractal H-Vicsek MIMO Antenna for 5G Communications", Przeglad Elektrotechniczny, ISSN 0033-2097, R. 97 NR Jun. 2021; Jun. 3, 2021; 6 pages.

Zhu et al., "A Low-Profile Superstrate-Microstrip Antenna with High Gain and Low RCS", Journal of Air Force Engineering University (Natural Sciences Edition), Issue 02; Apr. 25, 2018; 3 pages; English Abstract provided.

* cited by examiner

DISPLAY MODULE AND ELECTRONIC DEVICE

CROSS REFERENCE TO RELATED APPLICATION

The present application is a continuation of International Application No. PCT/CN2022/114417 filed on Aug. 24, 2022, which claims priority to Chinese Patent Application No. 202111678344.4 filed on Dec. 31, 2021, and titled “DISPLAY MODULE AND ELECTRONIC DEVICE”, both of which are hereby incorporated by reference in their entireties.

TECHNICAL FIELD

The present application relates to the field of display technology, and particularly to a display module and an electronic device.

BACKGROUND

An antenna is an important component of an intelligent terminal device such as a smart phone. With the vigorous development of mobile communication technology, 5G communication technology has been gradually popularized. However, the popularity of 5G communication technology has led to a large increase in the number of antennas of a mobile phone, so that the space inside the mobile phone for placing the antennas is seriously insufficient, then the efficiency of the antennas of the mobile phone is lower than the benchmark requirement, and thus challenges brought by the antennas of the mobile phone to engineers are increasing.

SUMMARY

Embodiments of the present application provide a display module and an electronic device, which can solve the problem of insufficient space inside a terminal device for placing antennas.

In a first aspect, the embodiments of the present application provides a display module including: a carrier including a first surface and a second surface arranged oppositely and a side surface located between the first surface and the second surface; and a first antenna including a first body and at least one connecting point connected with the first body, in which the first body is arranged in the carrier, and the connecting point is exposed on the side surface for being electrically connecting with a second antenna located outside the carrier.

In a second aspect, the embodiments of the present application provide an electronic device including the display module according to the embodiments in the first aspect.

In the display module and the electronic device according to the embodiments of the present application, the display module includes a carrier and a first antenna, the first antenna is integrated into the carrier, and more first antennas can be additionally arranged without increasing the volume of the display module. The connecting point of the first antenna may serve as a bonding point of the first antenna and the second antenna. By electrically connecting the first antenna and the second antenna, the number and the area of the antennas in the display module are increased as a whole, and the performance and the efficiency of the antennas in the display module can be ensured. In addition, the first antenna and the second antenna can be connected in close proximity, without arranging an antenna wiring and an antenna pad in the non-display area. On the one hand, a transmission path can be shortened, a loss of an antenna signal can be reduced, and on the other hand, a size of the non-display area can be reduced.

BRIEF DESCRIPTION OF THE DRAWINGS

Other features, objects, and advantages of the present application will become more apparent by reading the following detailed description of non-limiting embodiments with reference to the accompanying drawings, in which the same or similar reference numerals represent the same or similar features. The accompanying drawings are not drawn to actual scale.

DETAILED DESCRIPTION

Features of various aspects and exemplary embodiments of the present application will be described in detail below. In order to make objects, technical solutions and advantages of the present application clearer, the present application is further described in detail below with reference to the accompanying drawings and specific embodiments. It should be understood that the specific embodiments described herein are used to explain the present application only, but not to limit the present application. For those skilled in the art, the present application can be implemented without some of these specific details. The following description of the embodiments is only to provide a better understanding of the present application by illustrating examples of the present application.

Before the technical solutions provided by the embodiments of the present application are described, the problems in the art are first described in the present application to facilitate the understanding of the embodiments of the present application.

As described in the background, the large number of antennas are required in 5G communication technology, which is contrary to requirements for a smart terminal such as a smart phone of being light, thin, small and beautiful in design. Therefore, how to arrange more antennas in a smaller mobile phone is difficult.

In the related art, a display panel generally include an antenna module, an antenna wiring and an antenna pad. The antenna module is connected with the antenna pad through the antenna wiring, and is connected with a flexible circuit board through the antenna pad to transmit an antenna signal. The antenna wiring and the antenna pad are usually arranged in a non-display area. On the one hand, a path of the antenna wiring is relatively long, resulting in a loss of the antenna signal, and on the other hand, the antenna wiring and the antenna pad are required to be arranged in the non-display area, resulting in a relatively large size of a frame of a display apparatus.

Based on this, the embodiments of the present application provide a display module and an electronic device, which can solve the technical problem of insufficient space inside a terminal device for placing antennas.

Figure 1:
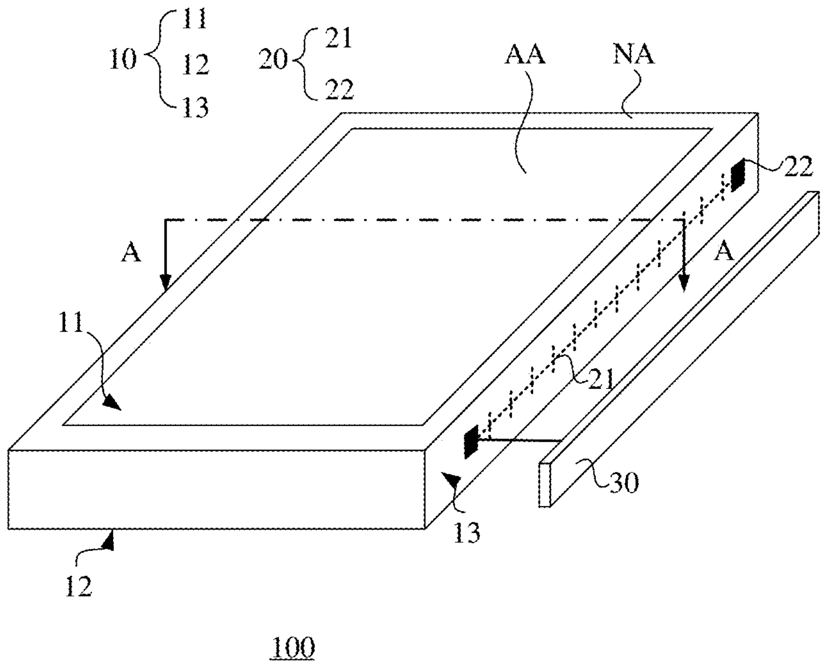
FIG. 1 shows a schematic structural diagram of a display module according to an embodiment of the present application.

As shown in FIG. 1, a display module 100 according to the embodiments of the present application includes: a carrier 10 including a first surface 11 and a second surface 12 arranged oppositely and a side surface 13 located between the first surface 11 and the second surface 12; and a first antenna 20 including a first body 21 and at least one connecting point 22 connected with the first body 21, in which the first body is arranged in the carrier 10, and the connecting point 22 is exposed on the side surface 13 for being electrically connected with a second antenna 30 located outside the carrier 10.

In the display module 100 according to the embodiments of the present application, the display module 100 includes a carrier 10 and a first antenna 20, the first antenna 20 is integrated into the carrier 10, and more first antennas 20 can be additionally arranged without increasing the volume of the display module 100. The connecting point 22 of the first antenna 20 may serve as a bonding point of the first antenna 20 and the second antenna 30. By electrically connecting the first antenna 20 and the second antenna 30, a number and an area of antennas in the display module 100 is increased as a whole, and the performance and efficiency of the antennas in the display module 100 can be ensured.

Exemplarily, the display module 100 may be a light-emitting device such as an organic light emitting diode (OLED), a liquid crystal display (LCD), a micro light emitting diode (Micro LED) and the like.

Optionally, the carrier 10 may include a display area AA and a non-display area NA arranged around at least a part of the display area AA. Exemplarily, the non-display area NA is arranged around the display area AA completely in FIG. 1. Exemplarily, the first antenna 20 is located in the non-display area NA and/or the display area AA.

In addition, the first body 21 of the first antenna 20 is directly connected with the second antenna 30 through the exposed connecting point 22 of the first antenna 20. By rationally setting a position of the connecting point 22, the first antenna 20 and the second antenna 30 can be connected in close proximity, without arranging an antenna wiring and an antenna pad in the non-display area NA. On the one hand, a transmission path can be shortened, a loss of an antenna signal can be reduced, and on the other hand, a size of the non-display area NA can be reduced.

Exemplarily, the first antenna 20 may be in a patterned structure, the second antenna may also be in a patterned structure, and a pattern of the first antenna 20 and the second antenna 30 may be set according to actual requirements, which is not limited in the present application.

Exemplarily, in a direction parallel to the side surface 13 of the carrier 10, the connecting point 22 may have a certain length and a certain width to achieve the stability of the electrical connection between the second antenna 30 and the connecting point 22. For example, an orthographic projection of the connecting point 22 on the side surface 13 may be a 3 mm by 3 mm square. Of course, the orthographic projection of the connecting point 22 on the side surface 13 may further have other shapes and other sizes.

Exemplarily, in a direction perpendicular to the side surface 13 of the carrier 10, the connecting point 22 may have a certain thickness. For example, a surface of the connecting point 22 close to the second antenna 30 may be level with the side surface 13 of the carrier 10 or may protrude from the side surface 13 of the carrier 10, so that the second antenna 30 may be in direct contact with the connecting point 22 to implement the electrical connection between them. In some other embodiments, the connecting point 22 may also be recessed in relation to the side surface 13, and the connection between the connecting point 22 and the second antenna 30 may be implemented with a conductive adhesive. Exemplarily, an additional connecting structure may also be disposed between the second antenna 30 and the connecting point 22 to implement the electrical connection between the second antenna 30 and the connecting point 22.

In order to show a position of the first antenna 20 and to show that the first body 21 of the first antenna 20 is wrapped by the carrier 10 clearly, the connecting point 22 is exposed on the side surface 13 of the carrier 10, and the first body 21 is shown in dashed lines and the connecting point 22 is shown in solid lines in FIG. 1. The first body 21 and the connecting point 22 may be formed integrally. The first body 21 is shown in dashed lines in FIG. 1 and is not necessarily located on the side surface 13.

The specific number of connecting points 22 of the first antenna 20 and the specific number of first antennas 20 may be determined according to actual requirements.

Exemplarily, one first antenna 20 may be arranged on the carrier 10, or a plurality of first antennas 20 may be arranged on the carrier 10.

Exemplarily, the first antenna 20 and the second antenna 30 may constitute one or more of antennas used in a bluetooth, a wireless network communication technology (Wi-Fi), a global positioning system (GPS), a near field communication (NFC), and a laser-direct-structuring (LDS).

Exemplarily, one of the second antenna 30 and the first antenna 20 may be configured to tune a resonance point and a bandwidth of an antenna and the other may be configured to improve the performance of the antenna. One is an auxiliary antenna, which enhances a signal, and one acts as a main antenna.

Optionally, in order to ensure the impedance requirements of the antenna, a material of the first antenna 20 may include a metal, for example, the first antenna 20 may include copper, silver, and the like. Similarly, a material of the second antenna 30 may further include a metal, for example, the second antenna 30 may further include copper, silver, and the like.

Exemplarily, the second antenna 30 may be arranged outside of the carrier 10, for example, the second antenna 30 may be arranged on a housing body of the display module 100.

The carrier 10 may be arranged in a variety of ways. As shown in FIG. 1, the carrier 10 may include one film layer, or as shown in FIG. 2, the carrier 10 may include a plurality of film layers that are stacked.

When the carrier 10 includes a plurality of film layers that are stacked, side surfaces of the plurality of film layers constitute the side surface 13 of the carrier 10 collectively. When the carrier 10 includes a single film layer, a side surface of the single film layer constitutes the side surface 13 of the carrier 10. The first surface 11 and the second surface 12 of the carrier are arranged oppositely, and the first surface 11 is located on a film layer of the plurality of film layers facing a side of a display surface of the display module. Optionally, the first surface 11 of the carrier 10 may be a surface of the plurality of film layers as a whole facing the display surface of the display module 100, and the second surface 12 of the carrier 10 may be a surface of the plurality of film layers as a whole facing away from the display surface of the display module 100 in relation to the first surface 11.

The side surface 13 may be located in the display area AA and/or the non-display area NA. For example, the side surface 13 is located in the non-display area NA, that is, the connecting point 22 is located in the non-display area NA, so that a position where the first antenna 20 and the second antenna 30 are electrically connected is located in the non-display area NA, preventing the electrical connection between the first antenna 20 and the second antenna 30 from affecting the display effect. On the other hand, the first antenna 20 and the second antenna 30 can be connected in close proximity, the transmission path can be shortened, and the loss of the antenna signal can be reduced.

Figure 2:
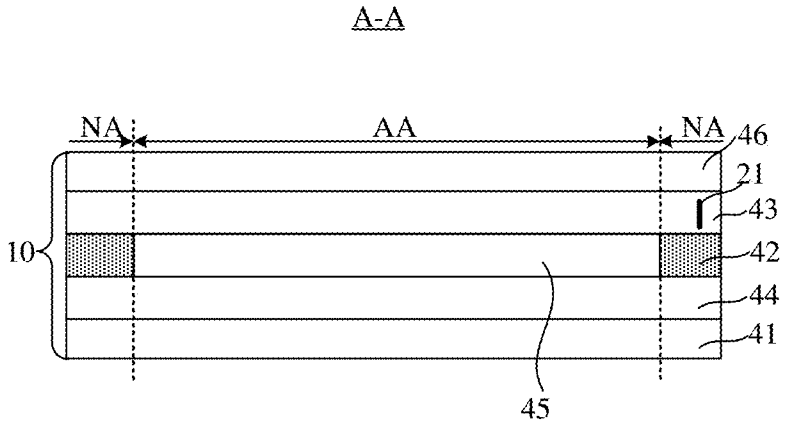
FIG. 2 shows a schematic cross-sectional structural diagram along a A-A direction in FIG. 1.

As shown in FIG. 2, the carrier 10 may include a substrate base plate 41, a frame sealing adhesive 42, and a packaging cap plate 43 that are stacked. The frame sealing adhesive 42 is located between the substrate base plate 41 and the packaging cap plate 43. The frame sealing adhesive 42 may be arranged in the non-display area NA. Exemplarily, the carrier 10 may further include an array base plate layer 44 located between the substrate base plate 41 and the packaging cap plate 43. The carrier 10 may further include a light-emitting layer 45 arranged in the display area AA and located between the array base plate layer 44 and the packaging cap plate 43. Components and signal wirings for driving the light-emitting layer 45 to emit light may be arranged in the array base plate layer 44, for example, components such as a transistor and a capacitor may be arranged in the array base plate layer 44. The light-emitting layer 45 may include an organic light emitting diode. The frame sealing adhesive 42 may be used to connect the substrate base plate 41 and the packaging cap plate 43, and the packaging cap plate 43 and the frame sealing adhesive 42 can constitute a packaging structure of the light-emitting layer 45, preventing external water and oxygen from invading the light-emitting layer 45.

Exemplarily, the carrier 10 may further include a touch wiring layer 46 located at a side of the packaging cap plate 43 away from the substrate base plate 41. The touch wiring layer 46 may include a touch electrode and a touch leading wire electrically connected with the touch electrode (not shown in the figure), and the touch leading wire may be electrically connected with a touch chip through a flexible printed circuit (FPC) (not shown in the figure), thereby implementing the touch function of the display module 100.

The packaging cap plate 43 and the frame sealing adhesive 42 may collectively constitute a packaging structure, and the packaging cap plate 43 and the touch wiring layer 46 may collectively constitute a touch structure, that is, the packaging cap plate 43 acts as the packaging cap plate 43 of the carrier 10 and also acts as a base of the touch structure, which can prevent from additionally providing the packaging cap plate 43 or additionally providing the substrate of the touch structure, reduce a layer of film layer structure, and be beneficial to implement the requirements for the display module 100 of being light and thin. Exemplarily, during the fabrication process of the carrier 10, the touch wiring layer 46 may be formed at a side of the packaging cap plate 43 to obtain the touch structure; and then an obtained touch structure is adhered to a side of the light-emitting layer 45 through the frame sealing adhesive 42 to obtain the carrier 10.

Exemplarily, both the substrate base plate 41 and the packaging cap plate 43 may be rigid structures. For example, a material of the substrate base plate 41 and the packaging cap plate 43 includes a rigid material such as glass. It can be understood that both the substrate base plate 41 and the packaging cap plate 43 are insulating structures.

Exemplarily, the framing sealing adhesive 42 may include glass powder, and it can be understood that the frame sealing adhesive 42 is also an insulating structure.

Optionally, as described above, when the carrier 10 includes a plurality of film layers, such as a substrate base plate 41, a frame sealing adhesive 42, a packaging cap plate 43 and a touch wiring layer 46, as shown in FIG. 2, the first body 21 may be arranged in any one or more of the plurality of film layers in the carrier 10, that is, the first body 21 may be arranged in any of the substrate base plate 41, the frame sealing adhesive 42, the packaging cap plate 43 and the touch wiring layer 46, and the connecting point 22 extends from the first body 21 and is exposed on the side surface 13. By integrating the first body 21 of the first antenna 20 in a film layer, the stability of a relative position between the first antenna 20 and the carrier 10 can be further improved, avoiding the risk of the first antenna 20 falling off.

Optionally, as described above, the first body 21 may be arranged in any of the plurality of film layers in the carrier 10, and a metal in any of the plurality of film layers may be reused as the first body 21, that is, a metal in any one or more of the array base plate layer, an anode layer, a cathode layer and the touch wiring layer may be reused as the first body 21. It is not necessary to additionally provide a separate antenna film layer in a film layer to thin a thickness of the whole carrier.

Optionally, as described above, when the carrier 10 includes the array base plate layer 44, the first antenna 20 may be arranged in the array base plate layer 44. Optionally, when the carrier 10 includes the touch wiring layer 46, the first antenna 20 is located in the touch wiring layer 46. Optionally, when the carrier 10 includes a metal layer, the first antenna 20 may be located in the metal layer, which may be a metal layer in the array base plate layer 44 or a metal layer in the touch wiring layer 46.

Figure 3:
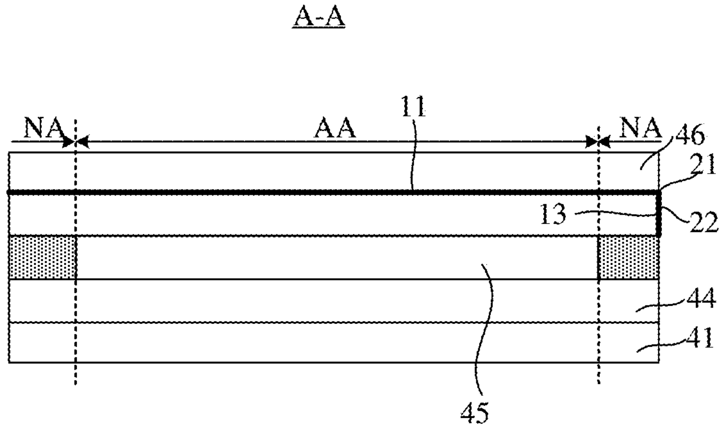
FIG. 3 shows a schematic cross-sectional structural diagram along a A-A direction in FIG. 1 in another embodiment.

As shown in FIG. 3, a first body 21 is arranged between any two of the plurality of film layers in the carrier 10, and the connecting point 22 extends from the first body 21 and is exposed on the side surface 13. When the carrier 10 includes a plurality of film layers, side surfaces of the plurality of film layers constitute the side surface 13 of the carrier 10 collectively. For example, the first body 21 is located between the touch wiring layer 46 and the packaging cap plate layer in FIG. 3.

When the carrier 10 includes a plurality of film layers, the first antenna 20 is embedded in the plurality of film layers in the carrier 10, and the connecting point 22 is exposed on the side surface 13. That is, the first antenna 20 is integrated in the carrier 10, the first body 21 is wrapped by the carrier 10, and the connecting point 22 is exposed. Since the connecting point 22 is exposed, the electrical connection between the second antenna 30 and the connecting point 22 can be conveniently implemented, that is, the electrical connection between the second antenna 30 and the first antenna 20 can be conveniently implemented.

Figure 4:
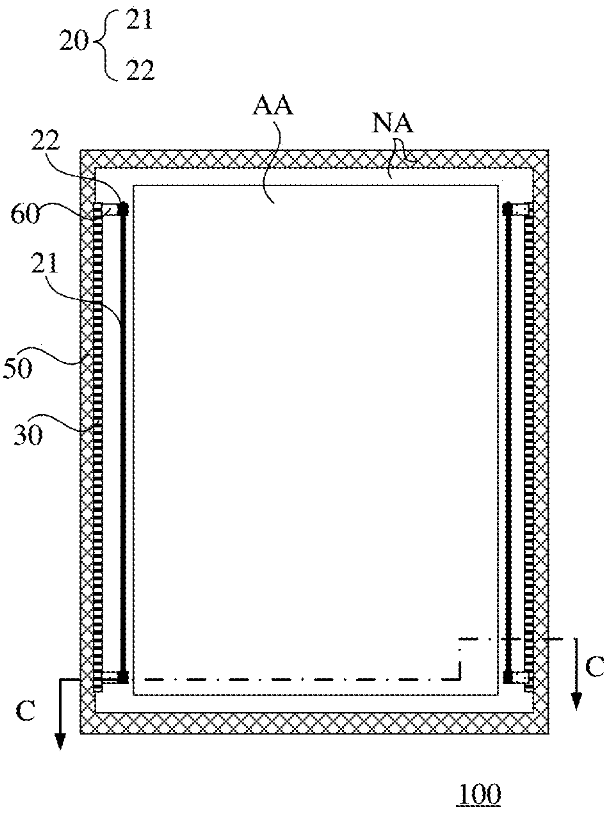
FIG. 4 shows a schematic structural diagram of a display module according to another embodiment of the present application.
Figure 5:
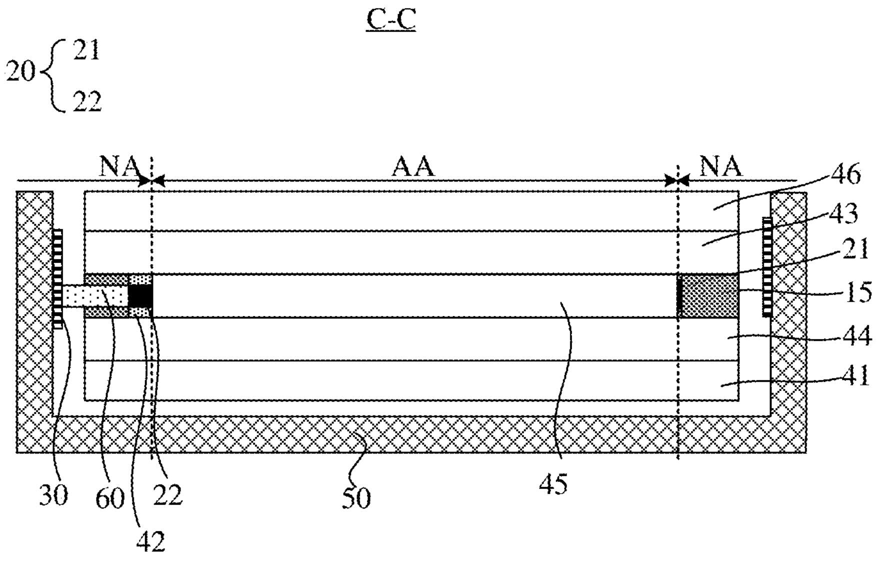
FIG. 5 shows a schematic cross-sectional structural diagram along a C-C direction in FIG. 4.

In some optional embodiments, as described above, the carrier 10 includes a packaging cap plate 43, and a frame sealing adhesive 42 connected with the packaging cap plate 43. As shown in FIG. 4 and FIG. 5, when the first body 21 may be arranged in any of the plurality of film layers in the carrier 10, the first body 21 may be arranged in the frame sealing adhesive 42.

In these optional embodiments, the first body 21 is arranged in the frame sealing adhesive 42. On the one hand, a position of the frame sealing adhesive 42 is relatively stable, and the first body 21 is located in the frame sealing adhesive 42, which can ensure the stability of a position of the first antenna 20. On the other hand, compared with arranging the first body 21 in the array base plate layer 44 or the touch wiring layer 46, the influence of the first antenna on other metal wirings in the array base plate layer 44 or the touch wiring layer 46 can be avoided. In addition, it is not necessary to additionally provide a metal structure as the first antenna 20, so that the cost can be saved and the occupation of space can be further reduced, which is more beneficial for implementing the requirements for the display module 100 of being light and thin.

When the first body 21 is arranged in the frame sealing adhesive 42, the frame sealing adhesive 42 includes a patterned first body 21. That is, the frame sealing adhesive 42 is patterned, the first body 21 is arranged in a patterned area, and then the first body 21 is covered by the frame sealing adhesive 42. As shown in FIG. 4, the first antenna 20 includes first bodies 21, the number of the first bodies 21 may be two or more, and two or more first bodies 21 may be arranged at intervals along a circumferential direction of the frame sealing adhesive 42. Exemplarily, during the fabrication process, a laser curing process may still be used to form the frame sealing adhesive 42.

Exemplarily, at least a part of the frame sealing adhesive 42 may be the first body 21. The at least a part of the frame sealing adhesive 42 includes glass powder and metal particles doped in the glass powder, and the metal particles form the first body 21. Herein, non-conductive glass powder may be construed as ordinary Frit.

Optionally, the metal particles may form a patterned metal structure in the non-conductive glass powder, and the metal structure is the first antenna 20.

Exemplarily, during the fabrication process, the metal particles may be doped in the non-conductive glass powder, so that the doped metal particles constitute a patterned first antenna 20. Exemplarily, a laser curing process may still be used to form the frame sealing adhesive 42.

Optionally, an insulation layer 70 may be further fabricated on the periphery of the frame sealing adhesive 42, the insulation layer 70 is located between the frame sealing adhesive 42 and the second antenna 30, and wraps a side surface of the frame sealing adhesive 42 for protecting the frame sealing adhesive 42 and preventing water and oxygen from invading since an antenna is arranged in the frame sealing adhesive 42. The insulation layer 70 may include an organic and/or inorganic insulating material. In addition, an opening may be disposed at a position in the insulation layer 70 corresponding to the connecting point 22 so as to expose the connecting point 22, and further, the connecting point 22 may still be connected with the second antenna 30 through the conductive adhesive 60, thereby omitting the flexible printed circuit (FPC) and reducing the cost. Exemplarily, the first antenna 20 may be distributed around the display area AA, and the second antenna 30 may also be distributed around the display area AA. A plurality of connecting points 22 may also be distributed around the display area AA, segmentation design may be performed on the insulation layer 70, and the conductive adhesive 60 may be filled between adjacent insulation layers 70. Exemplarily, the insulation layer 70 and the conductive adhesive 60 are arranged at intervals along a circumferential direction of the frame sealing adhesive 42, which prevents water and oxygen from damaging the display panel. Exemplarily, the insulation layer 70 may an adhesive layer for bonding with the packaging cap plate and the array base plate.

Figure 6:
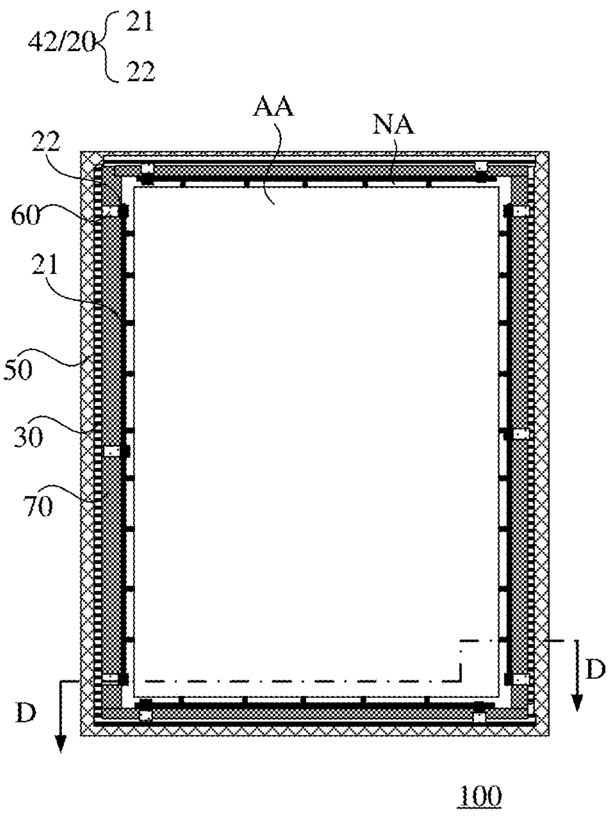
FIG. 6 shows a schematic structural diagram of a display module according to yet another embodiment of the present application.
Figure 7:
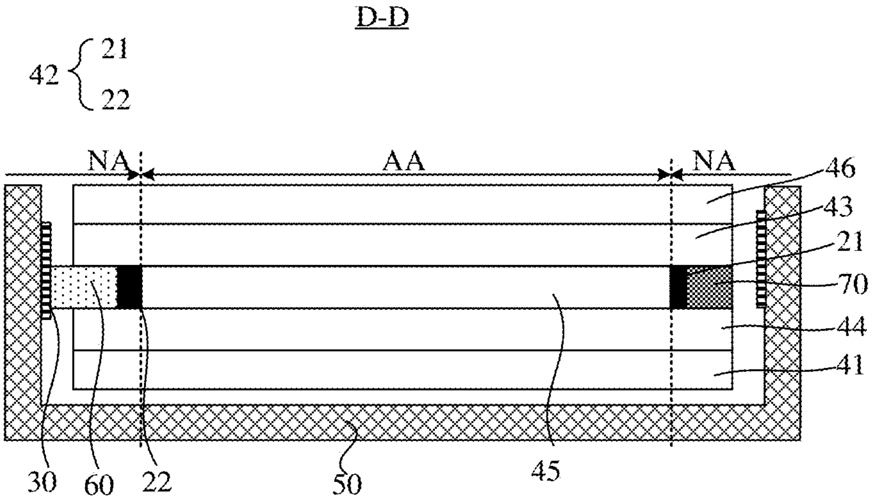
FIG. 7 shows another schematic cross-sectional structural diagram along a D-D direction in FIG. 6.

In some other embodiments, as shown in FIG. 6 and FIG. 7, that is, the frame sealing adhesive 42 as a whole is a patterned conductive structure, and the patterned conductive structure is reused as the first body 21.

Furthermore, since the frame sealing adhesive 42 is reused as the first antenna 20, the frame sealing adhesive 42 has a conductive performance. In order to protect the frame sealing adhesive 42 and avoid signal interference with other conductive structures, and further prevent water and oxygen from damaging the display panel, an insulation layer 70 may be further fabricated and located between the frame sealing adhesive 42 and the second antenna 30. The insulation layer 70 may include an organic and/or inorganic insulating material. In addition, an opening may be disposed at a position in the insulation layer 70 corresponding to the connecting point 22 so as to expose the connecting point 22, and further, the connecting point 22 may still be connected with the second antenna 30 through the conductive adhesive 60, thereby omitting the flexible printed circuit (FPC) and reducing the cost. Exemplarily, the first antenna 20 may be distributed around the display area AA, and the second antenna 30 may also be distributed around the display area AA. A plurality of connecting points 22 may also be distributed around the display area AA, segmentation design may be performed on the insulation layer 70, and the conductive adhesive 60 may be filled between adjacent insulation layers 70. Exemplarily, the insulation layer 70 and the conductive adhesive 60 are arranged at intervals along a circumferential direction of the frame sealing adhesive 42.

In yet some other optional embodiments, as described above, the carrier 10 further includes a packaging layer, such as a thin film packaging layer; the carrier 10 further includes a light-emitting layer 45 that is stacked with the packaging layer. The display module 100 further includes a dam arranged around the display area, the first antenna 20 is located at a side of the dam facing the display area, and the connecting point 22 extends from the first antenna to the side surface 13 through the dam; or the first antenna 20 is located at a side of the dam facing away from the display area, and the connecting point 22 extends from the first antenna to the side surface 13.

In these optional embodiments, the packaging layer may include a plurality of organic layers and a plurality of inorganic layers that are stacked alternatively, and the first body 21 may be located between an organic layer and an adjacent inorganic layer.

Optionally, the first antenna 20 may be arranged in the carrier 10 in various ways, and the first antenna 20 may be arranged on at least one of the first surface 11, the second surface 12, and the side surface 13 of the carrier 10.

Figure 8:
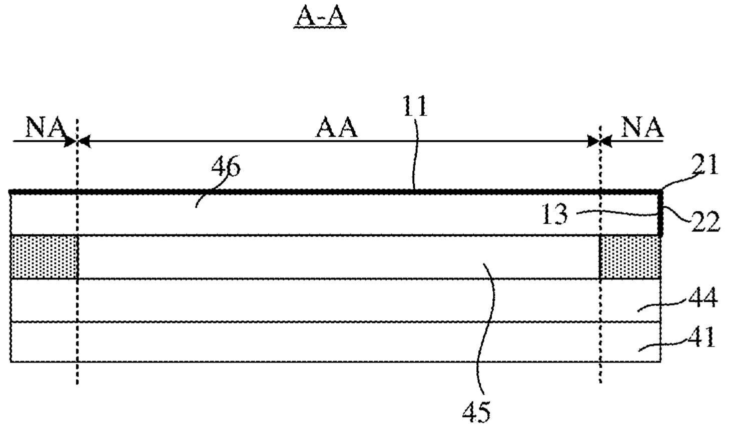
FIG. 8 shows a schematic cross-sectional structural diagram along a A-A direction in FIG. 1 in yet another embodiment.
Figure 9:
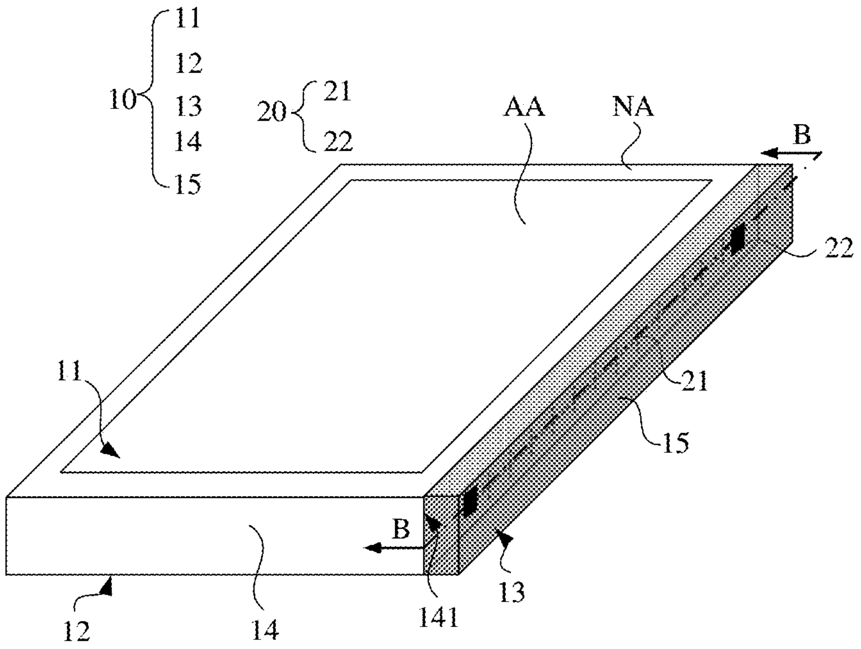
FIG. 9 shows a schematic structural diagram of a display module according to yet another embodiment of the present application.
Figure 10:
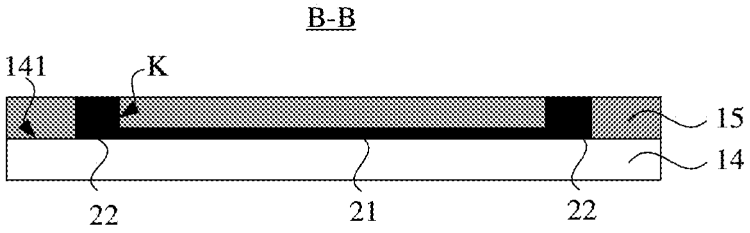
FIG. 10 shows a schematic cross-sectional structural diagram along a B-B direction in FIG. 9.

In some optional embodiments, as shown in FIG. 8, the first body 21 is located on the first surface 11 and/or the second surface 12 of the carrier 10, and the connecting point 22 extends from the first body 21 and are exposed on the side surface 13. That is, the first antenna is arranged on an opposite surface of the carrier 10. That is, under a condition that the carrier acts as a whole, the carrier 10 includes a plurality of film layers, and the first body 21 may be located on the surface of the plurality of film layers as a whole facing the display surface of the display module 100; and/or the first body 21 may be located on the surface of the plurality of film layers as a whole facing away from the display surface of the display module 100. That is, under a condition that the carrier 10 includes a film layer, the first body 21 may be located on a surface of the film layer facing the display surface of the display module 100, and/or the first body 21 may be located on a surface of the film layer facing away from the display surface of the display module 100.

In these embodiments, sufficient space may be reserved on the first surface 11 and/or the second surface 12 for the first antenna 20, so that a greater size of the first antenna 20 can be disposed, to further increase a power of the first antenna 20.

Optionally, the connecting point 22 extends from the first body 21 and is bent from the first surface 11 and/or the second surface 12 to the side surface 13, so that the first antenna and the second antenna 30 can be connected with each other on the side surface 13.

In some optional embodiments, as shown in FIG. 9 to FIG. 12, under a condition that the carrier 10 acts as a whole, the first body 21 is arranged in the side surface 13 of the carrier the display module includes an insulation protection layer 15 that at least covers the first body 21; and the insulation protection layer 15 includes an opening K, and the connecting point 22 is exposed from the opening K. The insulation protection layer 15 can provide protection to the first body 21, and the opening K on the insulation protection layer 15 can expose the connecting point 22 so as to avoid effects on the electrical connection of the first antenna 20 and the second antenna 30.

Optionally, under a condition that the connecting point 22 is located in the non-display area NA, the insulation protection layer 15 is located in the non-display area NA, the first body 21 of the first antenna 20 may be located between the side surface 13 and the insulation protection layer 15 of the carrier 10. The insulation protective layer 15 may include an opening K, and the connecting point 22 of the first antenna 20 may be exposed from the opening K.

Exemplarily, the carrier 10 includes a plurality of film layers, and the first body 21 is arranged in a side surface 13 of any one or more of the plurality of film layers of the carrier 10. For example, the carrier 10 includes at least one of the substrate base plate 41 and the packaging cap plate 43, and the first body 21 is arranged in a side surface 13 of the packaging cap plate 43. The carrier 10 may include a rigid material, such as glass. The insulation protection layer 15 may include an organic and/or inorganic material.

In the fabrication process, the carrier 10 may be fabricated first, and then the patterned first antenna 20 may be fabricated on the side surface 13 of the carrier 10 using a yellow light or printing process. Exemplarily, the first body 21 and the connecting point 22 of the first antenna 20 may be integrally formed on the side surface 13 of the carrier 10. An organic and/or inorganic material may then be printed or evaporated to form the insulation protection layer 15, so that a formed insulation protection layer 15 covers the first body 21 and exposes the connecting point 22. Exemplarily, a whole layer of the insulation protection layer 15 may be printed or evaporated and then windowed, so that an eventually formed insulation protection layer 15 covers the first body 21 and exposes the connecting point 22. A patterned insulation protection layer 15 may also be directly printed or evaporated, and a patterned insulation protection layer 15 that covers the first body 21 and exposes the connecting point 22 can be obtained directly.

Exemplarily, a side surface of the connecting point 22 facing away from the carrier 10 may be level with a side surface of the insulation protection layer 15 facing away from the carrier 10. Alternatively, the side surface of the connecting point 22 facing away from the carrier 10 is closer to the carrier 10 than the side surface of the insulation protection layer 15 facing away from the carrier 10, that is, the opening K of the insulation protection layer 15 may not be filled up with the connecting point 22. Alternatively, the side surface of the connecting point 22 facing away from the carrier 10 is further away from the carrier 10 than the side surface of the insulation protection layer 15 facing away from the carrier 10.

In some optional embodiments, the insulation protection layer 15 may be an adhesive layer for attaching the first body 21 onto the side surface 13 of the carrier 10.

Figure 11:
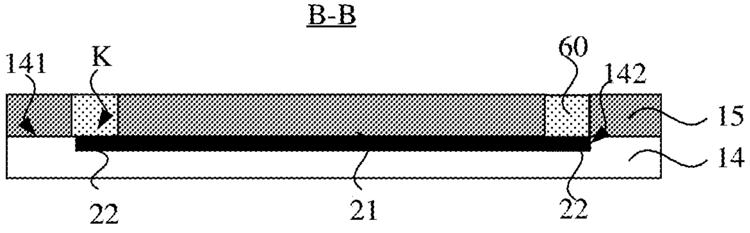
FIG. 11 shows another schematic cross-sectional structural diagram along a B-B direction in FIG. 9.

In some optional embodiments, as shown in FIG. 11, under a condition that the connecting point 22 is located in the opening K, the opening K may also be filled with a conductive adhesive 60, so that the connecting point 22 is electrically connected with the second antenna 30 through the conductive adhesive 60.

Optionally, under a condition that the first antenna 20 includes a plurality of connecting points 22, as shown in FIG. 11, a plurality of conductive adhesives 60 corresponding to the plurality of connecting points 22 may be independent of each other, that is, the plurality of conductive adhesives 60 are physically isolated from each other, so that signal crosstalk among different connecting points 22 is directly avoided from a physical structure.

Figure 12:
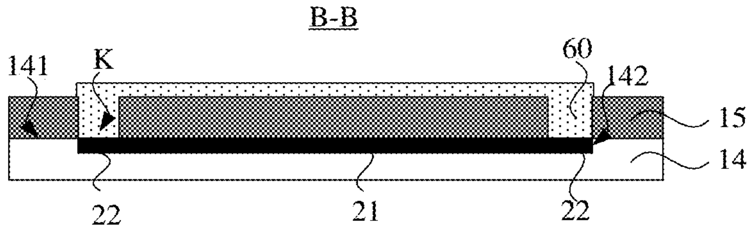
FIG. 12 shows yet another schematic cross-sectional structural diagram along a B-B direction in FIG. 9.

Optionally, as shown in FIG. 12, the conductive adhesives 60 corresponding to the plurality of connecting points 22 may be in an integrated structure. In order to avoid signal crosstalk among different connecting points 22, under a condition that the conductive adhesives corresponding to the plurality of connecting points 22 may be in an integrated structure, the conductive adhesives 60 may include an anisotropic conductive adhesive. An anisotropic conductive adhesive refers to an adhesive that is conductive in the Z direction and non-conductive in the X and Y directions. On the one hand, under a condition that the connecting points 22 are relatively dense, it is difficult to independently fabricate the plurality of conductive adhesives 60 corresponding to the plurality of connecting points 22 in the process, while the plurality of conductive adhesives 60 are set in an integrated structure, so that the conductive adhesives 60 corresponding to the plurality of connecting points 22 can be integrally formed, thereby reducing difficulty of the process; on the other hand, the conductive adhesives 60 include an anisotropic conductive adhesive, and even if the conductive adhesives corresponding to different connecting points 22 are physically connected with each other, the anisotropic conductive adhesive can ensure that the connecting points 22 are connected with the second antenna 30, and the electrical connection relationship among the different connecting points 22 through the conductive adhesives 60 is avoided, so that signal crosstalk between the different connecting points 22 can be avoided from an electrical signal.

In some optional embodiments, under a condition that the first antenna 20 is arranged on the side surface 13, the first antenna 20 may be attached directly onto the side surface 13. Optionally, an adhesive layer may be arranged directly between the side surface 13 and the first antenna 20.

In some other optional embodiments, as shown in FIG. 12, the carrier 10 includes a recess part 142 recessed from the side surface 13 of the carrier 10, and the first antenna 20 is located in the recess part 142. That is, the first antenna 20 is embedded in the side surface 13 of the carrier 10. The recess part 142 can provide a limit to the first antenna 20, ensuring the stability of the relative position between the first antenna 20 and the carrier 10.

Optionally, under a condition that the carrier 10 includes a plurality of film layers, the carrier 10 includes a second body 14, the recess part 142 is arranged in a side surface 13 of the second body 14, and the second body 14 is any of the film layers in the carrier 10, that is, a side surface 13 of any of the film layers is recessed to form the recess part 142.

The second body 14 includes two or more film layers, and sides of the two or more film layers are recessed collectively to form the recessed part 142. The sides of the two or more film layers form the side surface 13 collectively, an area of the side surface 13 can be increased, an area of the recess part 142 can be further increased, and a sufficient space can be reserved for an antenna.

The above-mentioned film layers included in the second body 14 may be any film layer in the carrier 10, for example, the second body 14 may include at least one of a support layer, a buffer layer, a substrate base plate, any metal layer or insulation layer in the array base plate layer 44 or the array base plate, a light-emitting layer 45, a packaging layer, a touch wiring layer 46, a polarizer layer, and a cap plate layer.

Optionally, the second body 14 may include at least one of a substrate base plate 41, a frame sealing adhesive 42, and a packaging cap plate 43. For example, the second body 14 includes a packaging cap plate 43 in FIG. 12, that is, the first antenna 20 may be integrated in the packaging cap plate 43.

In the embodiments of the present application, at least one of the substrate base plate 41, the frame sealing adhesive 42 and the packaging cap plate 43 in an original structure of the carrier 10 acts as the second body 14, an additional film layer may not be required as the second body 14, which is beneficial for implementing the requirements for the display module 100 of being light and thin. In addition, since the substrate base plate 41, the frame sealing adhesive 42 and the packaging cap plate 43 are insulating structures, and the first antenna 20 is integrated in at least one of the substrate base plate 41, the frame sealing adhesive 42 and the packaging cap plate 43, the first body 21 of the first antenna 20 is wrapped by an insulating material, and thus the first body 21 of the first antenna 20 can be prevented from contacting other conductive structures, so that signal crosstalk between the first antenna 20 and other conductive structures can be avoided.

Exemplarily, in the process of fabrication, the second body 14 may be fabricated first, a side wall 141 of the second body 14 may be planar, and the side wall 141 is the side surface 13 of the carrier 10 described above. The planar sidewall 141 is then etched, and the recess part 142 is obtained. A metal material may then be evaporated or printed in the recess part 142, resulting in the first antenna 20 located in the recess part 142. The first body 21 and the connecting point 22 of the first antenna 20 may also be integrally formed herein. Exemplarily, a thickness of the first body 21 may be the same as a thickness of the connecting point 22, but of course a first body 21 and a connecting point 22 with different thicknesses may be formed, which is not limited in the present application.

Exemplarily, the planar sidewall 141 may be etched with a light spot, and a recess part 142 is obtained. A width of the recess part 142 may be set according to the actual parameter requirements for the first antenna 20.

Exemplarily, the first antenna 20 may be a patterned structure, and thus the recess part 142 of the second body 14 may also be a patterned structure to fit the first antenna 20.

In the embodiments of the present application, the first antenna 20 is arranged in the recess part 142 of the second body 14, which can better protect the first antenna 20, avoid the first antenna 20 being scratched, and avoid signal crosstalk between the first antenna 20 and other conductive structures.

As described above, the second antenna 30 may be arranged outside the carrier 10. In some optional embodiments, as shown in FIG. 4 to FIG. 7, the display module 100 may include a middle frame 50 carrying the carrier 10. The second antenna 30 may be arranged in the middle frame 50. The second antenna 30 is electrically connected with the connecting point 22 through a conductive adhesive 60.

The middle frame 50 may be in a shell structure. The second antenna 30 may be arranged at a side of the middle frame 50 close to the carrier 10. In order to facilitate the connection between the first antenna 20 and the second antenna 30, the second antenna 30 may be close to the first antenna 20. The second antenna 30 may be connected with the connecting point 22 of the first antenna 20 through a conductive adhesive 60. By providing the conductive adhesive 60, a flexible FPC is not additionally required to connect the second antenna 30 and the connecting point 22 of the first antenna 20, so that the cost and space can be saved, which is more beneficial for implementing the requirements for the display module 100 of being light and thin.

Exemplarily, the conductive adhesive 60 may include conductive metal particles, which may be in a shape of a flake or a sphere. Exemplarily, for example, the conductive metal particle is in a shape of a sphere, the diameter of the conductive metal particle may range from 5 μm to 10 μm.

Optionally, the second antenna 30 and the connecting point 22 of the first antenna 20 are arranged oppositely, and the conductive adhesive 60 is located between the connecting point 22 and the second antenna 30. The second antenna 30 is opposite to the connecting point 22, that is, the second antenna 30 and the connecting point 22 are arranged at intervals in a direction from a center of the display area AA to the non-display area NA, that is, in a direction perpendicular to the side surface 13, an orthographic projection of the second antenna 30 on the side surface 13 overlaps at least a part of the connecting point 22. The second antenna 30 and the connecting point 22 are close, which can reduce an amount of the conductive adhesive and improve signal transmission between the second antenna 30 and the connecting point 22.

Exemplarily, under a condition that the carrier 10 includes two or more film layers, and each of the two or more film layers is provided with a first body 21 of a first antenna 20, the first antennas 20 in variety film layers may be connected with each other or may be not in a connection relationship, and it may be determined whether to connect the first antennas 20 in different film layers according to actual requirements.

It should be noted that the embodiments according to the present application may be combined with each other in the case of no contradiction.

Figure 13:
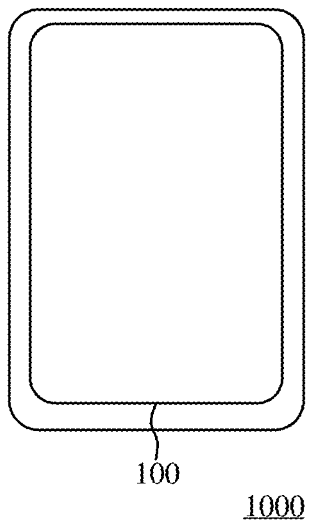
FIG. 13 shows a schematic structural diagram of an electronic device according to an embodiment of the present application.

The present application also provides an electronic device including the display module according to the present application. Referring to FIG. 13, which shows a schematic structural diagram of an electronic device according to the embodiments of the present application. The electronic device 1000 according to FIG. 13 includes the display module 100 according to any of the embodiments described in the present application. In the embodiment of FIG. 13, for example, the electronic device 1000 is illustrated with a mobile phone, and it can be understood that, the electronic device according to the embodiments of the present application may be other electronic device with a display function, such as, a wearable product, a computer, a television, and a vehicle-mounted display apparatus, which are not particularly limited by the embodiments of the present application. The electronic device according to the embodiments of the present application has beneficial effects of the display module according to the embodiments of the present application. For details, please refer to the specific descriptions of the display module in the above embodiments, which are not repeated in this embodiment.

The above embodiments of the present application do not exhaustively describe all the details, nor do they limit the present application to the specific embodiments as described. Obviously, according to the above description, many modifications and changes can be made. These embodiments are selected and specifically described in the specification to better explain the principles and practical applications of the present application, so that those skilled in the art can make good use of the present application and make modifications based on the present application The present application is limited only by the claims and the full scope and equivalents thereof.

What is claimed is:

1. A display module comprising:

a carrier comprising a first surface and a second surface arranged oppositely and a side surface located between the first surface and the second surface;

a first antenna comprising a first body and at least one connecting point connected with the first body, wherein the first body is arranged in the carrier, and the connecting point is exposed on the side surface for being electrically connected with a second antenna located outside the carrier, wherein the display module further comprises a middle frame carrying the carrier, and the second antenna is arranged in the middle frame and is connected with the connecting point through a conductive adhesive, the second antenna and the connecting point are arranged oppositely, and the conductive adhesive is located between the connecting point and the second antenna.

2. The display module according to claim 1, wherein the first body is arranged in the side surface;

the display module comprises an insulation protection layer covering at least the first body and comprising an opening, and the connecting point is exposed from the opening.

3. The display module according to claim 2, wherein the opening is filled with a conductive adhesive.

4. The display module according to claim 3, wherein the first antenna comprises a plurality of connecting points, and a plurality of conductive adhesives corresponding to the plurality of connecting points are independent of each other; or the conductive adhesives corresponding to the plurality of connecting points are in an integrated structure.

5. The display module according to claim 2, wherein the carrier comprises a recess part recessed from the side surface of the carrier, and the first antenna is located in the recess part.

6. The display module according to claim 5, wherein the carrier comprises a second body, and a side surface of the second body is recessed to form the recess part.

7. The display module according to claim 6, wherein the carrier comprises one or more film layers, and the second body is any film layer in the carrier; or the second body comprises two or more film layers, and sides of the two or more film layers are recessed collectively to form the recess part.

8. The display module according to claim 1, wherein the first body is located on the first surface, or the first body is located on the second surface, or the first body is located on the first surface and the second surface, and the connecting point extends from the first body and is exposed on the side surface.

9. The display module according to claim 1, wherein the carrier comprises a plurality of film layers that are stacked, and the first body is arranged in any film layer of the plurality of film layers in the carrier, or the first body is arranged between any two film layers of the plurality of film layers in the carrier, or a part of the first body is arranged in any film layer of the plurality of film layers in the carrier and another part of the first body is arranged between any two film layers of the plurality of film layers in the carrier, and the connecting point extends from the first body and is exposed on the side surface.

10. The display module according to claim 1, wherein the carrier comprises a packaging cap plate and a frame sealing adhesive connecting the packaging cap plate; and the first body is arranged in the frame sealing adhesive, or at least a part of the frame sealing adhesive is the first body.

11. The display module according to claim 10, wherein the first antenna comprises a plurality of first bodies arranged at intervals along a circumferential direction of the frame sealing adhesive.

12. The display module according to claim 10, wherein the frame sealing adhesive comprise glass powder and metal particles doped in the glass powder, and the metal particles form the first body.

13. The display module according to claim 10, wherein the display module further comprises an insulation layer wrapping a side surface of the frame sealing adhesive and comprising an opening, and the connecting point is exposed from the opening, and the opening is filled with a conductive adhesive.

14. The display module according to claim 13, wherein the insulation layer and the conductive adhesive are arranged at intervals along a circumferential direction of the frame sealing adhesive.

15. The display module according to claim 1, wherein the carrier further comprises a dam arranged around a display area, the first antenna is located at a side of the dam facing the display area, and the connecting point extends from the first antenna to the side surface through the dam; or the first antenna is located at a side of the dam facing away from the display area, and the connecting point extends from the first antenna to the side surface.

16. The display module according to claim 1, wherein in a direction perpendicular to the side surface, an orthographic projection of the second antenna on the side surface overlaps at least a part of the connecting point.

17. The display module according to claim 1, wherein the carrier comprises a display area and a non-display area arranged around at least a part of the display area, and the first antenna is located in the non-display area.

18. An electronic device comprising the display module according to claim 1.

19. A display module comprising:

a carrier comprising a first surface and a second surface arranged oppositely and a side surface located between the first surface and the second surface;

a first antenna comprising a first body and at least one connecting point connected with the first body, wherein the first body is arranged in the carrier, and the connecting point is exposed on the side surface for being electrically connected with a second antenna located outside the carrier, the first body is arranged in the side surface;

the display module comprises an insulation protection layer covering at least the first body and comprising an opening, the connecting point is exposed from the opening, and the opening is filled with a conductive adhesive.

20. A display module comprising:

a carrier comprising a first surface and a second surface arranged oppositely and a side surface located between the first surface and the second surface;

a first antenna comprising a first body and at least one connecting point connected with the first body, wherein the first body is arranged in the carrier, and the connecting point is exposed on the side surface for being electrically connected with a second antenna located outside the carrier, wherein the carrier further comprises a dam arranged around a display area, the first antenna is located at a side of the dam facing the display area, the connecting point extends from the first antenna to the side surface through the dam; or the first antenna is located at a side of the dam facing away from the display area, and the connecting point extends from the first antenna to the side surface, or, the first body is arranged in the side surface; the display module comprises an insulation protection layer covering at least the first body and comprising an opening, and the connecting point is exposed from the opening, and the carrier comprises a recess part recessed from the side surface of the carrier, and the first antenna is located in the recess part, or, the carrier comprises a plurality of film layers that is stacked, and the first body is arranged in any film layer of the plurality of film layers in the carrier, or the first body is arranged between any two film layers of the plurality of film layers in the carrier, or a part of the first body is arranged in any film layer of the plurality of film layers in the carrier and another part of the first body is arranged between any two film layers of the plurality of film layers in the carrier, and the connecting point extends from the first body and is exposed on the side surface, or, the carrier comprises a packaging cap plate and a frame sealing adhesive connecting the packaging cap plate and the first body is arranged in the frame sealing adhesive, or at least a part of the frame sealing adhesive is the first body.

* * * * *